(12) United States Patent
Chard et al.

(10) Patent No.: US 10,664,424 B2
(45) Date of Patent: May 26, 2020

(54) DIGITAL BUS ACTIVITY MONITOR

(71) Applicant: TEXAS INSTRUMENTS INCORPORATED, Dallas, TX (US)

(72) Inventors: Gary Franklin Chard, Murphy, TX (US); Tpinn Ronnie Koh, Plano, TX (US); Harshil Atulkumar Shah, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 53 days.

(21) Appl. No.: 15/801,653

(22) Filed: Nov. 2, 2017

(65) Prior Publication Data

US 2019/0129875 A1    May 2, 2019

(51) Int. Cl.

| | |
|---|---|
| *G06F 13/14* | (2006.01) |
| *G06F 13/38* | (2006.01) |
| *G06F 13/40* | (2006.01) |
| *G06F 13/42* | (2006.01) |
| *G06F 13/22* | (2006.01) |
| *G06F 1/3225* | (2019.01) |

(52) U.S. Cl.
CPC ............ *G06F 13/22* (2013.01); *G06F 1/3225* (2013.01); *G06F 13/404* (2013.01); *G06F 13/4282* (2013.01); *G06F 13/4291* (2013.01); *G06F 2213/0016* (2013.01)

(58) Field of Classification Search
CPC .......... G06F 13/14; G06F 13/38; G06F 13/40; G06F 13/42
See application file for complete search history.

(56) References Cited

U.S. PATENT DOCUMENTS

| | | |
|---|---|---|
| 5,938,742 A | 8/1999 | Faddell et al. |
| 6,396,167 B1 | 5/2002 | Simburger et al. |
| 8,452,897 B1 | 5/2013 | Fernald et al. |
| 8,572,419 B1 | 10/2013 | Donovan |
| 2001/0005892 A1 | 6/2001 | Watts, Jr. et al. |
| 2003/0070020 A1 | 4/2003 | Kondo et al. |
| 2009/0045945 A1 | 2/2009 | Yeh |
| 2013/0083829 A1 | 4/2013 | de Ruijter et al. |
| 2015/0081937 A1* | 3/2015 | Wong .................. G06F 13/4291 710/106 |
| 2015/0234774 A1* | 8/2015 | Sengoku ............. G06F 13/4295 710/106 |
| 2015/0323984 A1 | 11/2015 | Ganton et al. |
| 2018/0321725 A1 | 11/2018 | Shao et al. |

OTHER PUBLICATIONS

International Search Report for PCT/US2018/058825 dated Feb. 28, 2019.

* cited by examiner

*Primary Examiner* — David E Martinez
(74) *Attorney, Agent, or Firm* — Brian D. Graham; Charles A. Brill; Frank D. Cimino

(57) ABSTRACT

One example relates to a device that includes an activity monitor. The activity monitor includes a bus interface having inputs coupled to receive signals from a bus and having outputs coupled to provide signals to an other device. The activity monitor monitors the bus for a message directed to a predefined address that is associated with the other device in response to detecting that the other device is a low power sleep mode, the activity monitor outputs the predefined address to the other device to enable the other device to capture the predefined address, via the bus interface, in response to the monitored address matching the predefined address that is associated with the other device.

17 Claims, 2 Drawing Sheets

DIGITAL BUS ACTIVITY MONITOR

TECHNICAL FIELD

This disclosure relates generally to an activity monitor, and more specifically to a digital bus activity monitor.

BACKGROUND

Computers and other devices utilize digital buses to transfer data between components within a computer, or between computers. These digital buses utilize various media for such transfer of data. For example, these digital buses utilize wire (e.g., gold, copper, etc.), optical fiber, wireless communications, and/or any other media that provides for such transfer. These digital buses also utilize various agreed-upon formats for transmitting and receiving data between devices, or communication protocols for such transfer. Examples of these communication protocols include I2C, Transmission Control Protocol/Internet Protocol (TCP/IP), HyperText Transfer Protocol (HTTP), Simple Mail Transfer Protocol (SMTP), File Transfer Protocol (FTP), Serial Peripheral Interface (SPI)/Universal Asynchronous Receiver Transmitter (UART) protocol, or any other protocol that provides for such transfer.

SUMMARY

One example relates to a device that includes an activity monitor. The activity monitor includes a bus interface having inputs coupled to receive signals from a bus and having outputs coupled to provide signals to an other device. The activity monitor monitors the bus for a message directed to a predefined address that is associated with the other device in response to detecting that the other device is in a low power sleep mode, the activity monitor outputs the predefined address to the other device to enable the other device to capture the predefined address, via the bus interface, in response to the monitored address matching the predefined address that is associated with the other device.

Another example relates to a method that includes receiving signals from a bus. The method further includes monitoring, by an activity monitoring, the bus for a predefined address while an other device, which is coupled to receive the signals from the bus, operates in a low power sleep mode. The method further includes outputting a wakeup request to the other device in response to the monitored address matching the predefined address that is associated with the other device. The method further includes outputting the predefined address, from the activity monitor, to the other device in response to the other device awaking from the low power sleep mode.

Another example relates to an other device that includes an asynchronous address detector, an address regenerator, and a controller. The asynchronous address detector is coupled to a clock line of a bus and a data line of the bus, the asynchronous address detector monitoring the bus for a predefined address that is associated with an other device that is coupled to the bus. The address regenerator is coupled to output the predefined address and a clock signal to respective inputs of the other device in response to the other device awaking from a low power sleep mode. The controller activates the asynchronous address detector to monitor the I2C bus for the address while the other device is in the low power sleep mode, deactivates the asynchronous address detector to discontinue the monitoring the I2C bus for the address after the other device has awoken from the low power sleep mode, in response to the other device awaking from the low power sleep mode.

DETAILED DESCRIPTION

The disclosure relates to an activity monitor for monitoring activity on a digital bus, hereafter referred to as a "bus". As one example, a device includes an activity monitor. The activity monitor includes a bus interface having inputs coupled to receive signals from a bus and having outputs coupled to provide signals to an other device. The activity monitor asynchronously monitors the bus for an address and outputs a predefined address to the other device, via the bus interface, in response to the monitored address matching the predefined address that is associated with the other device.

To help conserve power, many electronic devices are increasingly using a low power sleep mode. For example, if a request is made of the other device while the other device is asleep, the request may be missed because the other device needs to be awake to respond to the request. If the other device wakes up to analyze the address, only to realize that the request message was not addressed to that device, power can be wasted, which works against the purpose of the low power sleep mode. To overcome the adverse effects of erroneous wakeup events, this disclosure provides an activity monitor device that monitors for an address and, if that address matches a predefined address associated with the other device, the device outputs the predefined address to the other device in a way that ensures that the request is received by the other device. The activity monitor device further is configured to utilize significantly less power than the other device. Thus, such monitoring and matching results in the address being output to the other device in the event of the match, which helps conserve power as well as prevents the other device from erroneously awaking from the low power sleep mode. This prevention of the other device from awaking allows the other device to remain in the low power sleep mode for longer periods of time; that is until the address and the predetermined address match, thereby conserving power within the other device.

Figure 1:
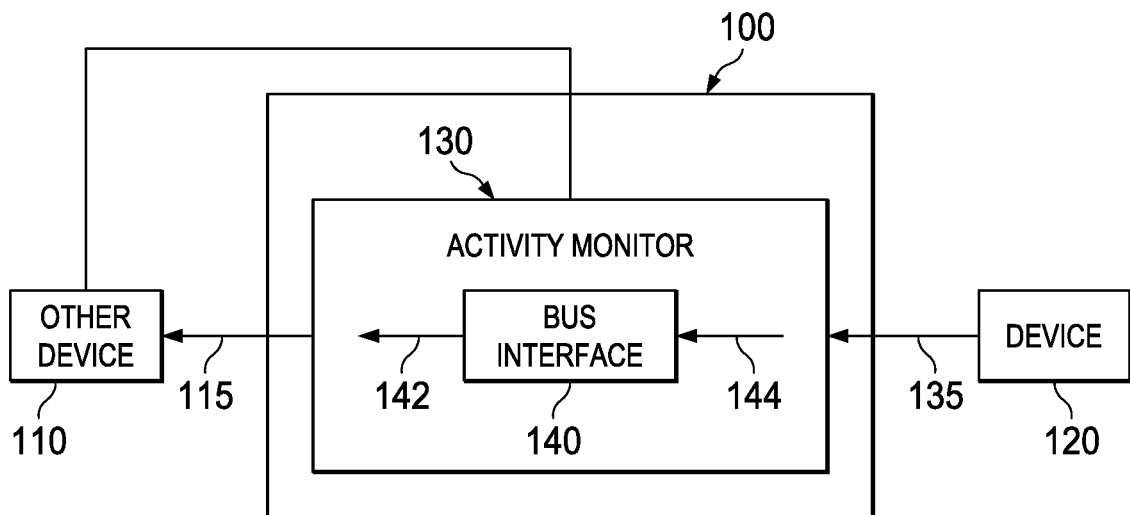
FIG. 1 illustrates an example device that monitors for an address on a bus.

FIG. 1 illustrates an example device 100 that monitors for an address on a bus. The device 100 includes an activity monitor 130, with the activity monitor 130 including a bus interface 140. The bus interface 140 is coupled to a device 120 and an other device 110. The bus interface 140 is coupled to the device 120 via a bus 135 and to the other device 110 via another bus 115, the bus interface 140 having an input 144 coupled to receive signals from this bus 135. The bus interface 140 further includes an output 142 to provide signals to the other device 110.

The activity monitor 130 is coupled to the other device 110 to determine if the other device 110 is operating in a low power sleep mode (e.g., a system clock signal sys_clk for the other device 100 is OFF, with a slow clock signal being ON for the other device 100 to operate on) or has awoken (e.g., the other device 100 operating on the system clock signal sys_clk) from the low power sleep mode, such as by receiving a signal from the other device 110 indicating an operating mode of such other device 110. The activity monitor 130 monitors the bus 135 for a message directed to a predefined address and outputs a predefined address to the other device 110 via the bus interface 140 in response to determining that the other device 110 is in the low power sleep mode. The activity monitor 130 compares addresses received via the bus interface 140 to the predefined address associated with the other device 110, and determines if one of the addresses received via the bus 135 matches the predefined address. The activity monitor 130 outputs an awaken signal to the other device 110 in response to detecting the address received from the bus 135 matches the predefined address. The activity monitor 130 outputs this predefined address to the other device 110, via the bus interface 140, in response to detecting that the other device 110 has awoken from the low power sleep mode. The activity monitor 130 outputs (e.g., re-generates) this predefined address to the other device 110 via the bus interface 140. The activity monitor 130 outputs the predefined address to the other device 110 to enable the other device 110 to capture the predefined address, via the bus interface 140. The activity monitor 130 may also pause the bus 135 temporarily to provide sufficient time for the other device 110 to wake up, receive the address and process the request. Thus, the activity monitor 130 enables requests sent to the other device 110 while it is in the low power sleep mode to be processed by the other device 100 without data loss. The activity monitor 130 terminates the monitoring in response to detecting that the other device 110 has awoken from the low power sleep mode. Thus, outputting the awaken signal to the other device 110 that is in a low power sleep mode awakens the other device 110 in response to the activity monitor 130 detecting a match, preventing the other device 110 from awakening from the low power sleep mode to determine if a match occurs. This prevention of the other device 110 from awakening from the low power sleep mode conserves power that would otherwise be used by the other device 110 to determine if a match occurs.

Figure 2:
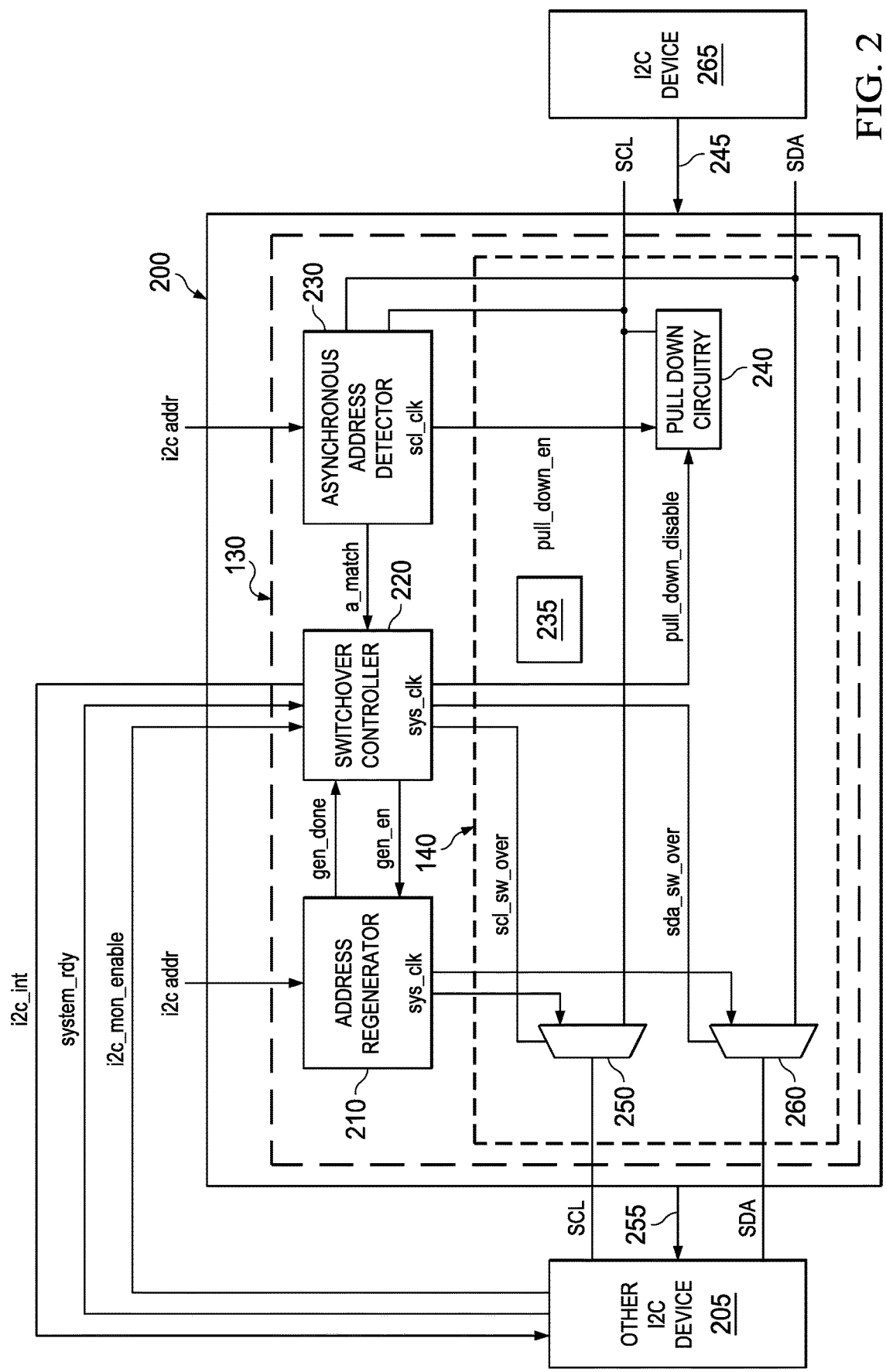
FIG. 2 illustrates another example device that monitors for an address on a bus.

FIG. 2 illustrates another example device 200 that monitors for an address on a bus. In this example, the activity monitor 130 includes an address regenerator 210, a switchover controller 220, and an asynchronous address detector 230, and the bus interface 140 includes a multiplexer 250, another multiplexer 260, and a pull down circuitry (e.g., a switch) 240.

The asynchronous address detector 230 is coupled to an I2C device 265 (e.g. an I2C master device) via a serial clock line (SCL) and a serial data line (SDA), together forming an I2C bus 245. The asynchronous address detector 230 is further coupled to the switchover controller 220 and the pull down circuitry 240. The device 200 includes a non-volatile memory (e.g., a register) 235 that stores the predefined address that is associated with an other I2C device 205. In an example, the predefined address is stored in a firmware of the device 200. The asynchronous address detector 230 receives addresses from the I2C bus 245, compares these addresses to the predefined address, and determines if one of these addresses received from the I2C bus 245 matches the predefined address. Although not shown, there can be numerous I2C devices coupled to the I2C bus 245, each of the I2C devices being addressable with a unique address. In the event that the asynchronous address detector 230 matches one of the addresses detected on the I2C bus 245 with the stored predefined address, the asynchronous address detector 230 outputs an a_match signal to the switchover controller 220. The asynchronous address detector 230 is further coupled to the pull down circuitry 240.

Also in the event that the asynchronous address detector 230 detects a match for an address detected on the I2C bus 245 with the stored predefined address, the asynchronous address detector 230 outputs a pull_down_en_signal to enable the pull down circuitry 240. Additionally, in the event that the asynchronous address detector 230 detects a match for an address detected on the I2C bus 245 with the stored predefined address the switchover controller 220 outputs a wakeup request, e.g., an i2c_int interrupt signal, to the other I2C device 205 to awake the other I2C device 205 from the low power sleep mode. In an example, the asynchronous address detector 230 is implemented with a state machine, which lowers a cost of implementing the device 200 and lowers power requirements of the device 200. The device 200 operates in a very lower power state only consuming leakage power, with the asynchronous address detector 230 operating asynchronously with respect to the I2C device 265 and the other I2C device 205 via a serial clock signal from the SCL of the I2C bus 245. Relying on a serial clock signal received on the SCL of the I2C bus 245 and without having to independently generate a clock signal within the device 200, the device 200 operates asynchronously and with less power to perform its address matching functions than if the device 200 had to generate its own clock signal.

The switchover controller 220 is coupled to the address regenerator 210. The switchover controller 220 controls whether the other I2C device 205 (e.g., an I2C slave device) receives a serial clock signal and data from the I2C bus 245 or a serial clock signal and data from the address regenerator 210. Whether the other I2C device 205 receives a serial clock signal and data from the I2C bus 245 or a serial clock signal and data from the address regenerator 210 depends upon whether the other I2C device awakens from a low power sleep mode, as discussed herein. In response to receiving the a_match signal from the asynchronous address detector 230, the switchover controller outputs a gen_en signal to activate the address regenerator 210 for re-generating the predefined address that is provided to the other I2C device 205.

As a further example, the switchover controller 220 is further coupled to the other I2C device 205, the multiplexer 250, the other multiplexer 260, and the pull down circuitry 240. In response to the other I2C device 205 awakening from the low power sleep mode, the switchover controller 220 receives a system_rdy signal from the other I2C device 205, the system_rdy signal indicating that the other I2C device 205 has awoken from the low power sleep mode. In response to receiving the system_rdy signal, the switchover controller 220 outputs a gen_en signal to the address regenerator 210 for re-generating the predefined address and a serial clock signal for the other I2C device 205. Additionally, in response to the other I2C device 205 awakening from the low power sleep mode, the switchover controller 220 outputs an scl_sw_over signal to the multiplexer 250 and an sda_sw_over signal to the other multiplexer 260, the scl_sw_over signal indicating that the multiplexer 250 is to switch between its two inputs and the sda_sw_over signal indicating that the multiplexer 260 is to switch between its two inputs. When the other I2C device 205 enters the low power sleep mode, the switchover controller 220 receives a i2c_mon_enable signal from the other I2C device 205. The switchover controller 220 responds to the i2c_mon_enable signal by activating the asynchronous address detector 230 to monitor addresses on the SDA of the I2C bus 245, in particular for the predefined address associated with other I2C device 205. Additionally, the switchover controller 220 responds to the system_rdy signal from the other I2C device 205, by deactivating the asynchronous address detector 230 to discontinue monitoring addresses on the SDA of the I2C bus 245 after the other I2C device 205 has awoken from the low power sleep mode. The switchover controller 220 further controls the pull down circuitry 240 according to an operating mode of the other I2C device 205, such as discussed below.

By way of example, the address regenerator 210 outputs the predefined address and a serial clock signal, which it re-generates, to respective inputs of the other I2C device 205 in response to the monitored address matching the predefined address while the other I2C device 205 is in the low power sleep mode (responsive to the i2c_mon_enable signal). The address regenerator 210 re-generates the predefined address that is matched by the asynchronous address detector 230 received on the I2C bus 245. For instance, the predefined address associated with the I2C device 205 is stored in the non-volatile memory 235 coupled to an input of the address regenerator 210. The address regenerator 210 receives the gen_en signal from the switchover controller 220. In response to receiving the gen_en signal, the address regenerator 210 re-generates and outputs a message including the predefined address and a serial clock signal to the other I2C device 205, which occurs in response to the detecting that the monitored address matches the predefined address associated with the other I2C device 205. The address regenerator 210 outputs a message data packet, which includes the predefined address, to the multiplexer 250 and outputs the re-generated serial clock signal to the other multiplexer 260. Subsequent to outputting the data packet and the serial clock signal to the multiplexer 250 and the other multiplexer 260, respectively, the address regenerator 210 outputs a gen_done signal to the switchover controller 220. In response to receiving the gen_done signal, the switchover controller 220 outputs a pull_down_disable signal to the pull down circuitry 240 to disable (deactivate) the pull down circuitry 240. Additionally, in response to the gen_done signal, the switchover controller 220 outputs the scl_sw_over signal to the multiplexer 250 and the sda_sw_over signal to the other multiplexer 260.

As a further example, the pull down circuitry 240 either pulls down the SCL of the I2C bus 245, that is it holds the SCL of the I2C bus 245 at a low logical level (e.g., electrical ground), or alternatively allows the SCL of the I2C bus 245 to operate unimpeded. Pulling down the SCL of the I2C bus 245 enables the device 200 to utilize the clock stretching feature of the I2C protocol to prevent an additional request from being transmitted to the other I2C device 205 in response to the monitored address matching the predefined address. The pull down circuitry 240 pulls down the SCL of the I2C bus 245 in response to receiving the pull_down_en signal from the asynchronous address detector 230, the pull_down_en signal being generated in response to the monitored address matching the predefined address. Likewise, the pull down circuitry 240 allows the SCL of the I2C bus 245 to operate unimpeded in response to receiving the pull_down_disable signal from the asynchronous address detector 230. The pull down circuitry 240 thus is activated to pull down or pause the SCL of the I2C bus 245 in response to the activity monitor 130 detecting that the monitored address matches the predefined address while the other 2C device 205 operates in the low power sleep mode and until detecting that the other I2C device 205 has awoken from the low power sleep mode.

In an example, the address regenerator 210 is clocked via a serial clock signal scl_clk received via the SCL of the I2C bus 245, which eliminates a clock signal from having to be generated from within the device 200. The switchover controller 220 and the asynchronous address detector 230 receive a separate sys_clk signal from a system in which the device 200 operates and is clocked by the sys_clk. Since the switchover controller 220 and the asynchronous address detector 230 are initially deactivated while the asynchronous address detector 230 determines if one of addresses received from the I2C bus 245 matches the predefined address, the device 200 operates in a very low power state consuming only leakage power. Thereafter, once an address match is detected by the asynchronous address detector 230 and the switchover controller 220 and the asynchronous address detector 230 are activated, the power requirements of the device 200 returns to the very low power state consuming only leakage power.

The multiplexer 250 is coupled to the SCL of the I2C bus 245, to the address regenerator 210, and a SCL of an other I2C bus 255 that is coupling the other I2C device 205, the SCL and a SDA together forming the other I2C bus 255. The multiplexer 250 outputs a clock signal or another clock signal dependent upon if the other I2C device 205 is in a low power sleep mode or if the other I2C device 205 awakes from the low power sleep mode. While the other I2C device 205 is in the low power sleep mode, the multiplexer 250 outputs another clock signal, e.g., a serial clock signal received from the address regenerator 210. In response to the activity monitor 130 detecting that the other I2C device awakens from the low power sleep mode, the multiplexer 250 passes the clock signal, e.g., the serial clock signal from the SCL of the I2C bus 245, to the other I2C device 205 in response to detecting that the other I2C device 205 has awoken from the low power sleep mode. The multiplexer 250 receives the scl_sw_over signal from the switchover controller 220 that switches the multiplexer 250 from outputting the serial clock signal received from the address regenerator 210 to outputting (passing) the serial clock signal received from the SCL of the I2C bus 245 to the clock input of the device 205. Although the device 200 is illustrated as being disposed between the I2C device 265 and the other I2C device 205, in an example the device 200 can be integrated into the other I2C device 205, with the other I2C bus 255 therefore being internal to the other I2C device 205.

In the example of FIG. 2, the other multiplexer 260 is coupled to the SDA of the I2C bus 245, to the address regenerator 210, and the SDA of the other I2C bus 255 that is coupling the other I2C device 205. The other multiplexer 260 outputs a different data packet in response to the other I2C device 205 being in the low power sleep mode or if the other I2C device 205 awakes from the low power sleep mode. While the other I2C device 205 is in a low power sleep mode, the other multiplexer 260 outputs a data packet received from the address regenerator 210, the data packet including the predefined address. The other multiplexer 260 passes a message including the predefined address to the other I2C device 205 in response to the activity monitor 130 detecting that the other I2C device 205 has awoken from the low power sleep mode. In response to the activity monitor 130 detecting that other I2C 205 device awakens from the low power sleep mode, the other multiplexer 260 outputs a data packet, e.g., a request, received from the SDA of the I2C bus 245. The multiplexer 250 receives the sda_sw_over signal from the switchover controller 220 that switches the other multiplexer 260 from outputting the data packet received from the address regenerator 210 to outputting the data packet received from the SDA of the I2C bus 245.

Figure 3:
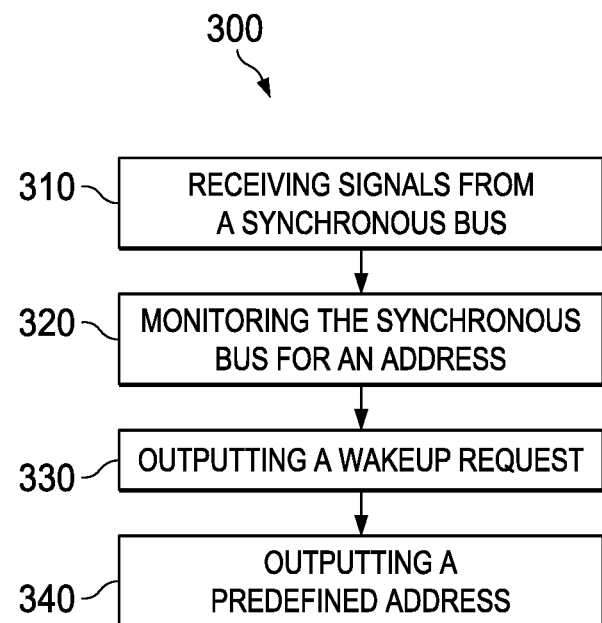
FIG. 3 illustrates an example method of monitoring for an address on a bus.

In view of the foregoing structural and functional features described above, a method in accordance with various aspects of the present disclosure will be better appreciated with reference to FIG. 3. While, for purposes of simplicity of explanation, the method of FIG. 3 is shown and described as executing serially, it is to be understood and appreciated that the present disclosure is not limited by the illustrated order, as some aspects may, in accordance with the present disclosure, occur in different orders and/or concurrently with other aspects from that shown and described herein. Moreover, not all illustrated features may be required to implement a method in accordance with an aspect of the present disclosure. The example method of FIG. 3 may be implemented by hardware, such as in an IC chip or a combination of analog and/or discrete circuit components. In the example of FIG. 3, for purposes of explanation, the method 300 is described in the context of the example system of FIG. 2. In other examples, the method 300 may be implemented with respect to circuits and devices configured differently.

FIG. 3 illustrates an example method 300 of monitoring for an address on a bus. At 310, the method 300 receives signals from the bus 135. In an example, the bus 135 is the I2C bus 245. In an example, the signals received from the I2C bus 245 include a serial clock signal and a data packet request. The serial clock signal is received on a SCL of the I2C bus 245 and the data packet request is received on a SDA of the I2C bus 245. In an example, the asynchronous address detector 230 is coupled to the SCL and SDA of the I2C bus 245 and receives the serial clock signal and the data packet request via the SCL and SDA, respectively.

At 320, the method 300 monitors the bus 135 for the predefined address while the other I2C device 205 operates in the low power sleep mode. The activity monitor 130 monitors the bus 135 for the predefined address and outputs the predefined address to an other device 110 via the bus interface 140 in response to a monitored address matching the predefined address. In an example, the activity monitor 130 includes the asynchronous address detector 230 that is coupled to a SDA of the I2C bus 245. The asynchronous address detector 230 monitors addresses received from the SDA of the I2C bus 245, compares these addresses to the predetermined address, and determines if one of these addresses matches the predefined address associated with the other I2C device 205. In an example, the method at 320 pulls down the SCL of the I2C bus 245. The asynchronous address detector 230 outputs a pull_down_en signal to the pull down circuitry 240 in response to one of these addresses matching the predefined address. The pull down circuitry 240 pulls down the SCL of the I2C bus 245 in response to one of these addresses matching the predefined address.

At 330, the method 300 outputs the wakeup request. In an example, the switchover controller 220 outputs the wakeup request, e.g., an i2c_int interrupt signal, to the other I2C device 205 to awake the other I2C device 205 from the low power sleep mode. This wakeup request is output from the switchover controller 220 in response to the monitored address matching the predefined address that is associated with the other I2C device 205.

At 340, the method 300 outputs the predefined address. The predefined address is output from the activity monitor 130 to the other device 110 in response to the other device 110 awaking from the low power sleep mode. The bus interface 140 outputs the predefined address to the other device 110 in response to the other device 110 awaking from the low power sleep mode. In an example, the address regenerator 210 generates a data packet including the predefined address and outputs this data packet to the multiplexer 250, the multiplexer 250 outputting the data packet including the predefined address to the other I2C device 205.

Modifications are possible in the described example embodiments, and other embodiments are possible, within the scope of this application, including the appended claims.

What is claimed is:

1. A device, comprising:
an activity monitor that includes a bus interface having inputs coupled to a bus and having outputs coupled to a second device such that the second device is coupled to the bus by way of the activity monitor, wherein the activity monitor is configured to:
monitor the bus for a message directed to a predefined address that is associated with the second device in response to detecting that the second device is a low power sleep mode; and
output the predefined address to the second device to enable the second device to capture the predefined address, via the bus interface, in response to a monitored address matching the predefined address that is associated with the second device.

2. The device of claim 1, wherein the bus is an I2C bus including a serial clock line (SCL) and a serial data line (SDA), the message being received on the SDA.

3. The device of claim 1, wherein the activity monitor includes an address regenerator that re-generates the predefined address and a clock signal to respective inputs of the second device in response to the monitored address matching the predefined address while the second device is in the low power sleep mode.

4. The device of claim 3, wherein the activity monitor includes a multiplexer coupled to the address regenerator, the multiplexer outputting the re-generated clock signal while the second device is in the low power sleep mode and passing a system clock signal from the bus to the second device in response to detecting that the second device has awaken from the low power sleep mode.

5. The device of claim 3, wherein the activity monitor includes a multiplexer coupled to the address regenerator, the multiplexer outputting the predefined address while the second device is in the low power sleep mode and passing an other message from the bus to an other input of the second device after detecting that the second device awakens from the low power sleep mode.

6. The device of claim 1, further comprising pull down circuitry, coupled to a serial clock line (SCL) of the bus, the pull down circuitry being activated to pause the bus in response to the activity monitor detecting the predefined address until the second device has awoken from the low power sleep mode.

7. The device of claim 6, further comprising:
an asynchronous address detector coupled to the bus; and
a switchover controller to activate the asynchronous address detector to receive the signals from the bus while the second device is in the low power sleep mode, to deactivate the asynchronous address detector to discontinue receiving the signals from the bus in response to the second device has awoken from the low power sleep mode, and to control the pull down circuitry according to an operating mode of the second device.

8. The device of claim 7, wherein the asynchronous address detector is coupled to a serial clock line (SCL) of the bus and a serial data line (SDA) of the bus, and clocked via the SCL to monitor for the predefined address.

9. A device, comprising:
an activity monitor configured to couple a second device to a first bus that includes a bus interface that includes:
a set of inputs configured to couple to the first bus; and a set of output configured to couple to the second device via a second bus that is different from the first bus;

wherein the activity monitor is configured to:
detect that the second device is in a low power mode;
in response to the second device being in the low power mode, monitor the first bus for a first message directed to an address that is associated with the second device;
monitor the second device for waking in response to the first message; and
in response to the second device waking, provide a second message on the second bus based on the first message.

10. The device of claim 9, wherein the second message is a regenerated version of the first message.

11. The device of claim 9, wherein the first bus is an I2C bus and the set of inputs of the bus interface include a clock input configured to couple to a serial clock line (SCL) of the first bus and a data input configured to couple to a serial data line (SDA) of the first bus.

12. The device of claim 9, wherein the activity monitor includes an address regenerator that regenerates the second message and a clock signal to provide to the second device in response to the second device waking.

13. The device of claim 12, wherein the activity monitor includes a multiplexer coupled to the address regenerator, the multiplexer outputting the clock signal to the second bus in response to the second device waking and passing a system clock signal from the first bus to the second bus otherwise.

14. The device of claim 12, wherein the activity monitor includes a multiplexer coupled to the address regenerator, the multiplexer outputting the second message to the second bus in response to the second device waking and passing a third message from the first bus to the second bus otherwise.

15. The device of claim 9, further comprising pull down circuitry configured to couple to a serial clock line (SCL) of the bus, the pull down circuitry being activated to pause the first bus in response to the activity monitor detecting that the first message is directed to the address that is associated with the second device until the second device has awoken from the low power mode.

16. The device of claim 15, further comprising:
an asynchronous address detector configured to couple to the first bus; and
a switchover controller configured to activate the asynchronous address detector to receive signals from the first bus while the second device is in the low power mode, deactivate the asynchronous address detector to discontinue receiving the signals from the first bus in response to the second device has awoken from the low power mode, and to control the pull down circuitry according to an operating mode of the second device.

17. The device of claim 16, wherein the asynchronous address detector is configured to couple to a serial clock line (SCL) of the first bus and a serial data line (SDA) of the first bus, and to be clocked via the SCL to monitor for the first message that is directed to the address that is associated with the second device.

* * * * *